UNITED STATES PATENT OFFICE.

LEON LILIENFELD, OF VIENNA, AUSTRIA-HUNGARY.

COMPOUND FOR PRODUCING SILK-LIKE EFFECTS.

960,100. Specification of Letters Patent. Patented May 31, 1910.

No Drawing. Application filed May 4, 1907. Serial No. 371,765.

*To all whom it may concern:*

Be it known that I, LEON LILIENFELD, scientific chemist, a subject of the Emperor of Austria-Hungary, and a resident of Zeltgasse 1, Vienna VIII, in the Empire of Austria-Hungary, have invented new and useful Improvements Relating to Compounds for the Production of Silk-Like Effects; and I do hereby declare the following to be a full, clear, and exact description of the invention, such as will enable others skilled in the art to which it appertains to make and use the same.

The invention relates to coloring matter for producing silk-like or pearl-luster effects, and such, for instance, as described in the Letters Patent of the United States, No. 834,739, granted to me on October 30, 1906.

The object of the present invention is to provide a new and improved coloring matter for producing silk-like or pearl-luster effects when applied to various articles made of wood, metal, paper, leather, textile fabrics, etc.

The coloring matter consists essentially of finely pulverized mica and a compound formed of viscose and a metal of the magnesium group.

I have found that the compounds of viscose with the metals of the magnesium group, and in particular the zinc salt of viscose, present great advantages for the present process as compared with viscose *per se.*

The advantages of the compounds of viscose with the metals of the magnesium group, and in particular zinc, as compared with viscose, are as follows: 1. Elimination of a cleaning or washing process of the supports provided with the layers. 2. Less alkalinity; an advantage which is of importance not only to the supports, but also to any added dye stuff.

As is well known the raw viscose contains numerous impurities and if the raw viscose is used as an element in forming the coloring matter, it is first necessary to wash or clean the material to free it from impurities before applying the coloring matter. This washing or cleaning process is expensive besides being troublesome, especially when the material to be colored is paper in rolls or the like. When the coloring matter is formed with a compound of viscose and a metal of the magnesium group then the washing or cleaning process is not necessary as the compound is free of impurities. The raw viscose contains a rather large percentage of alkalies, while the compounds of viscose with the metals of the magnesium group contain a very small percentage of alkalies, or, in some cases, they merely contain ammonia and no caustic alkalies. From the foregoing it is evident that if the viscose compounds are used in forming the coloring matter, the material to which the coloring matter is applied, suffers less than when coated with a coloring matter having raw viscose as an element. The desired color is given to the coloring matter by the addition of a suitable pigment.

The process is carried into practice by employing in place of the viscose protected in the main Patent No. 834,739, the viscose zinc salt obtained by precipitating a neutral or slightly acid viscose with a zinc salt solution dissolved in dilute alkalies, ammonia, solutions of alkaline salts etc.

What I claim as my invention and desire to secure by Letters Patent is:

1. Coloring matter for producing silk-like effects, consisting of a mixture of mica and a compound formed of viscose and a metal of the magnesium group.

2. Coloring matter for producing silk-like effects, consisting of a mixture of finely pulverized mica and a zinc salt of viscose.

3. Coloring matter for producing silk-like effects, consisting of a mixture of pulverized mica and a zinc salt of viscose obtained by precipitating a neutral or slightly acid viscose with a zinc salt solution dissolved in dilute alkalies, ammonia, solutions of alkaline salts and the like.

4. Coloring matter for producing silk-like effects, consisting of a mixture of mica and a compound formed of viscose and a metal of the magnesium group, and pigments.

5. Coloring matter for producing silk-like effects, consisting of a mixture of finely pulverized mica and a zinc salt of viscose, and pigments.

In testimony whereof I have signed my name to this specification in the presence of two subscribing witnesses.

LEON LILIENFELD.

Witnesses:
WENZEL SINKE,
ROBT. W. HEINGARTNER.